United States Patent
Kondalam et al.

(10) Patent No.: US 10,812,446 B1
(45) Date of Patent: Oct. 20, 2020

(54) DYNAMIC HOST CONFIGURATION ACROSS MULTIPLE SITES IN SOFTWARE DEFINED ACCESS NETWORKS

(71) Applicant: Cisco Technology, Inc., San Jose, CA (US)

(72) Inventors: Satish Kumar Kondalam, Milpitas, CA (US); Sanjay K. Hooda, Pleasanton, CA (US); Shyamsundar N. Maniyar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/518,896

(22) Filed: Jul. 22, 2019

(51) Int. Cl.
  *H04L 29/12* (2006.01)
  *H04L 12/66* (2006.01)
  *H04L 12/46* (2006.01)

(52) U.S. Cl.
  CPC ...... *H04L 61/2015* (2013.01); *H04L 12/4679* (2013.01); *H04L 12/66* (2013.01)

(58) Field of Classification Search
  CPC .. H04L 61/2015; H04L 12/66; H04L 12/4679
  USPC ....................................... 709/230
  See application file for complete search history.

(56) References Cited

U.S. PATENT DOCUMENTS

| | | |
|---|---|---|
| 7,051,089 B1 | 5/2006 | Johnson et al. |
| 7,302,484 B1 | 11/2007 | Stapp et al. |
| 8,937,955 B2 | 1/2015 | Ramesh et al. |
| 9,014,054 B2 | 4/2015 | Dunbar et al. |
| 9,634,934 B2 | 4/2017 | Thyamagundalu et al. |
| 9,887,961 B2 | 2/2018 | Rong et al. |
| 2006/0161661 A1 | 7/2006 | Johnson et al. |
| 2011/0317703 A1 | 12/2011 | Dunbar et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2013/0279519 A1* | 10/2013 | Lu .................. H04L 69/08 370/467 |
| 2015/0078387 A1 | 3/2015 | Dunbar et al. |

(Continued)

FOREIGN PATENT DOCUMENTS

| | | |
|---|---|---|
| AU | 2011276409 B2 | 5/2015 |
| BR | 112012018762 A2 | 5/2016 |

(Continued)

*Primary Examiner* — Tu T Nguyen
(74) *Attorney, Agent, or Firm* — Patterson + Sheridan, LLP (57) ABSTRACT

The present disclosure provides for dynamic host configuration across multiple sites in software defined networks, by: receiving, from a host, a DHCP (Dynamic Host Configuration Protocol) discover message at an edge network device of a site; adding to the DHCP discover message a sender border network device IP (Internet Protocol) address for a border network device of the site; transmitting the DHCP discover message, from the border network device to a DHCP server located externally of the site to instruct the DHCP server to return a DHCP offer packet including a destination border network device IP address for a destination border network device of a destination site; receiving the DHCP offer packet; and in response to determining that the destination border network device IP address matches the sender border network device IP address, forwarding the DHCP offer packet to the edge network device to perform DHCP forwarding.

20 Claims, 5 Drawing Sheets

(56) References Cited

U.S. PATENT DOCUMENTS

| | | |
|---|---|---|
| 2015/0222534 A1 | 8/2015 | Dunbar et al. |
| 2016/0036620 A1 | 2/2016 | Dunbar et al. |
| 2016/0112370 A1* | 4/2016 | Theogaraj ............ H04L 61/2092 709/245 |
| 2016/0344687 A1 | 11/2016 | Rong et al. |
| 2017/0195225 A1 | 7/2017 | Thyamagundalu et al. |
| 2018/0077114 A1 | 3/2018 | Rong et al. |

FOREIGN PATENT DOCUMENTS

| | | |
|---|---|---|
| BR | 112012033693 A2 | 12/2016 |
| CA | 2781060 A1 | 12/2011 |
| CA | 2804141 A1 | 1/2012 |
| CN | 102577331 A | 7/2012 |
| CN | 102971992 A | 3/2013 |
| CN | 103270736 A | 8/2013 |
| CN | 104396192 A | 3/2015 |
| CN | 107615716 A | 1/2018 |
| CN | 108200225 A | 6/2018 |
| DE | 112016001657 T5 | 12/2017 |
| EP | 2489172 A1 | 8/2012 |
| EP | 2569905 A2 | 3/2013 |
| EP | 2589188 A1 | 5/2013 |
| EP | 2589208 A1 | 5/2013 |
| GB | 2555740 A | 5/2018 |
| JP | 2013514046 A | 4/2013 |
| JP | 2013535870 A | 9/2013 |
| JP | 2018519687 A | 7/2018 |
| KR | 20120083920 A | 7/2012 |
| MX | 2012007559 A | 7/2012 |
| MX | 2013000140 A | 7/2013 |
| RU | 2013103703 A | 9/2014 |
| SG | 186487 A1 | 2/2013 |
| WO | 2011150396 A1 | 12/2011 |
| WO | 2012006170 A2 | 1/2012 |
| WO | 2012006190 A1 | 1/2012 |
| WO | 2012006198 A2 | 1/2012 |
| WO | 2016188375 A1 | 12/2016 |

\* cited by examiner

DYNAMIC HOST CONFIGURATION ACROSS MULTIPLE SITES IN SOFTWARE DEFINED ACCESS NETWORKS

TECHNICAL FIELD

Embodiments presented in this disclosure generally relate to Software Defined Networks (SDN). More specifically, embodiments disclosed herein relate to dynamic host configuration in SDNs that include multiple sites that are located at different geographic locations from one another.

BACKGROUND

The Dynamic Host Configuration Protocol (DHCP) allows a host device to request that a DHCP server dynamically assign IP (Internet Protocol) address and other network settings (e.g., subnet masks, default gateways, Domain Name Server (DNS) settings) to the host device. The DHCP server thus provides centralized allocation and management of IP addresses and network settings to a variety of host devices connected to a network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for dynamic host configuration across multiple sites in software defined networks, the method including: receiving, from a host, a DHCP (Dynamic Host Configuration Protocol) discover message at an edge network device of a site; adding to the DHCP discover message a sender border network device IP (internet protocol) address for a border network device of the site; transmitting the DHCP discover message, from the border network device to a DHCP server located externally of the site, wherein the DHCP discover message instructs the DHCP server to return a DHCP offer packet that includes a destination border network device IP address for a destination border network device of a destination site; receiving the DHCP offer packet from the DHCP server; and in response to determining that the destination border network device IP address matches the sender border network device IP address, forwarding the DHCP offer packet to the edge network device to perform DHCP forwarding.

One embodiment presented in this disclosure provides a method for dynamic host configuration across multiple sites in software defined networks, the method including: receiving, from a host, a DHCP (Dynamic Host Configuration Protocol) discover message at an edge network device of a site; adding to the DHCP discover message: a site identifier that includes identifiers for every border network device included in the site; transmitting the DHCP discover message, from one border network device included in the site to a DHCP server located externally of the site, wherein the DHCP discover message instructs the DHCP server to return a DHCP offer packet that includes a destination site identifier for a destination site; receiving the DHCP offer packet from the DHCP server at a given border network device included in the site; and in response determining that a given identifier associated with the given border network device is included in the identifiers included in the destination site identifier, forwarding the DHCP offer packet to the edge network device to perform DHCP forwarding for the host.

One embodiment presented in this disclosure provides a multi-site network capable of dynamic host configuration across multiple sites in software defined networks, including: a first site, comprising: a first border network device communicatively connected with a transit network; a first host; and a first edge network device communicatively connecting the host with the first border network device; a second site, comprising: a second border network device communicatively connected with the transit network; wherein the first site is communicatively connected to the second site between the first border network device and the second border network device over the transit network; wherein in response to receiving a DHCP discover message from the host to a DHCP server, the first border network device is configured to: add a border identifier to the DHCP discover message; and transmit the DHCP discover message to the DHCP server; wherein in response to receiving a DHCP offer packet responsive to the DHCP discover message, the first border network device is configured to: in response to determining that the first site is an intended destination for the DHCP offer packet, forward the DHCP offer packet to the first edge network device to perform DHCP forwarding for the host; and wherein in response to receiving the DHCP offer packet responsive to the DHCP discover message, the second border network device is configured to: in response to determining that the second site is not the intended destination for the DHCP offer packet, forward the DHCP offer packet to the first site.

Example Embodiments

Software Defined Networks (SDN) stretched across multiple remote sites, which are geographically separated from one another, are increasingly being deployed to serve users who are located at different locations as a single network that spans multiple locations. For example, an enterprise may have several campuses (e.g., an office in city A and an office in city B), and may deploy an SDN so that the networks at each campus are linked and behave as a single network for the hosts connected to the network (e.g., using the same subnet mask, designated Domain Name Server, etc.). Additionally, several addresses and other identifier of devices within a given site are known locally within that site, but are unknown at the remote sites, and only the IP (Internet Protocol) addresses of devices on the public border of each site are known or shared with the remote sites. These public-facing or "border" devices may use a shared address to further provide a uniform appearance of the SDN as a single network, despite being stretched across multiple remote locations. The fact that the hosts connected to the SDN and devices external to the SDN see the SDN as a single network, despite being spread across several locations, provides several benefits in the efficiency and security of communications, but may cause difficulties when requesting or assigning network settings to the client devices, such as via DHCP (Dynamic Host Configuration Protocol) requests. The present disclosure provides for improvements in handling network setting assignment across multi-site networks by configuring network devices, such as switches, to route the requesting and assigning communications to the intended destinations based on conversationally learned characteristics of the network.

Figure 1:
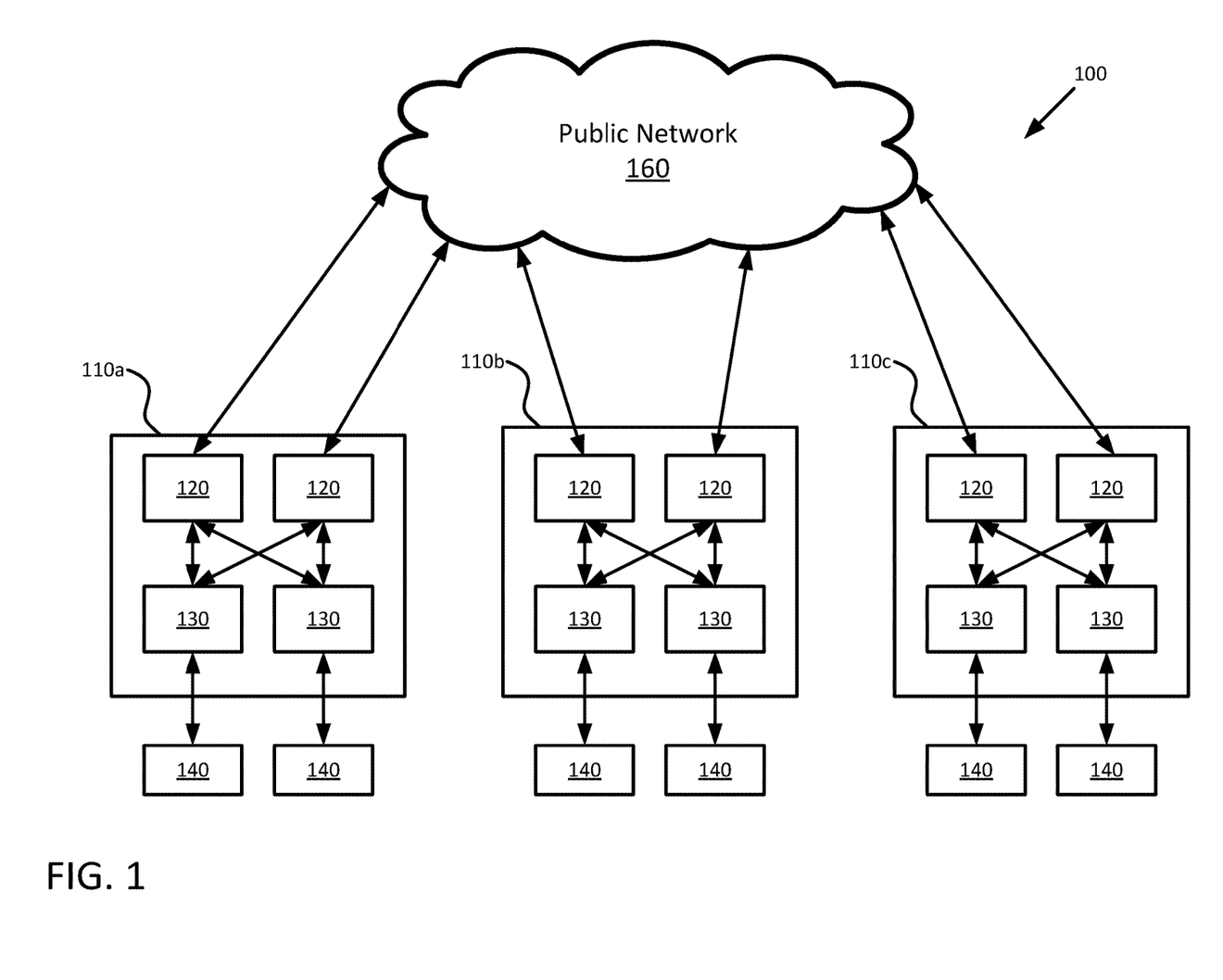
FIG. 1 illustrates a network fabric, according to embodiments of the present disclosure.

FIG. 1 illustrates a network fabric 100, according to embodiments of the present disclosure. The illustrated network fabric 100 is an SDN that includes a first site 110a (generally, site 110), a second site 110b, and a third site 110c, where each of the sites 110 are located at different geographic locations from one another (i.e., are remotely located). Although three sites 110a-c are discussed in the examples herein, a network fabric 100 may include more than or fewer than three sites 110 in other examples. Each of the sites 110 is connected to the other sites 110 in the network fabric 100 via a transit network 160, such as the Internet or another public network, to operate as a single network despite the distances between remotely located elements.

In FIG. 1, each site 110 includes various border switches 120 (also referred to as spine switches) and edge switches 130 (also referred to as leaf switches) that may be divided into various clusters based on communication paths, tenants of the site 110, etc. The border switches 120 and the edge switches 130 are specialized computer networking devices for routing data within a network. Example hardware that may be used in a border switch 120 or an edge switch 130 is discussed in relation to FIG. 5.

As illustrated, the edge switches 130 route communication flows through the border switches 120, and the border switches 120 route communication flows through the edge switches 130. Stated differently, within a site 110, the border switches 120 are not in direct communication with other border switches 120, and the edge switches 130 are not in direct communication with other edge switches 130. In the illustrated network fabric 100, the border switches 120 in remote sites 110 are communicated together to link the sites 110 over the transit network 160 into the network fabric 100. Although each of the border switches 120 are illustrated as being connected to each of the edge switches 130 in a given site 110 in FIG. 1, other arrangements are contemplated.

Various hosts 140 are connected to the edge switches 130, and host/provide the workloads and computing applications for various users. Although one host 140 is illustrated in communication with each edge switch 130, an edge switch 130 may be in communication with several hosts 140 at the same time, although, when connected, a given host 140 is in communication with one edge switch 130 at any given time.

A user may add or remove a host 140 to or from a particular site 110, move a host 140 from a first site 110a to a second site 110b (e.g., a user on a business trip visiting the second site 110b from the first site 110a), or reattach a host 140 from one switch to another (e.g., for load balancing purposes). When a connection for a host 140 to the network fabric 100 changes, the host 140 may request new network settings, including a new IP address via a DHCP discover message to a DHCP server.

The collected edge switches 130 share an IP address within the network fabric 100 used as an "any-cast address" which is used for relaying DHCP messages, which enables the network fabric 100 to behave as a single site 110 when viewed from the perspective of the hosts 140 or devices outside of the network fabric 100. Stated differently, the network fabric 100 appears like a single large switch to external devices; presenting a single gateway IP address, gateway Media Access Control (MAC) address, Spanning Tree Protocol (STP) bridge identifier, etc. The monolithic appearance of the network fabric 100 prevents DHCP messages from DHCP servers located at a different sites 110 or outside of the network fabric 100 (e.g., from a different network fabric 100) from being directed to an intended target edge switch 130 and host 140 without additional handling or information for how to route the DHCP messages.

Figure 2:
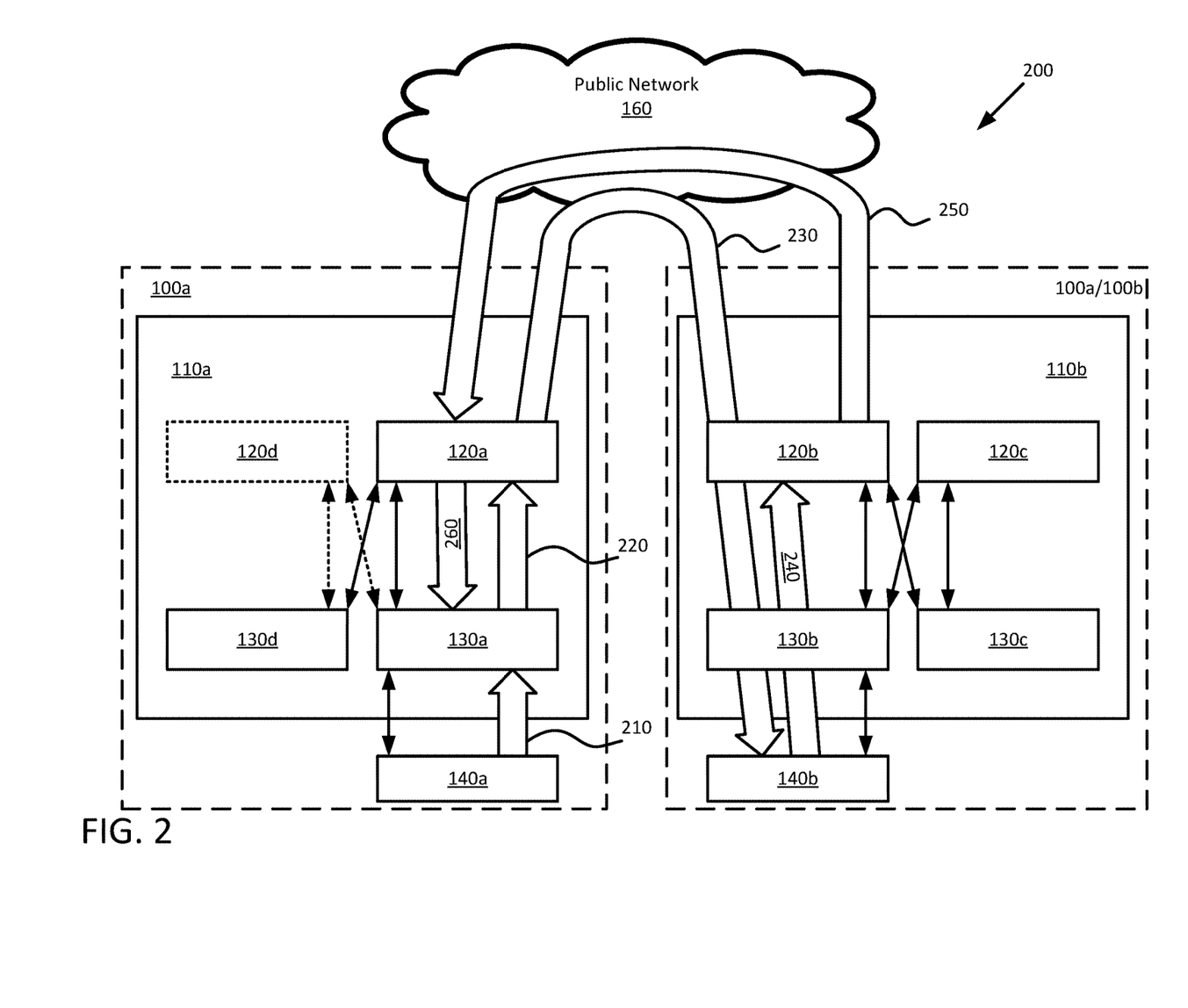
FIG. 2 illustrates a communications flow for handling dynamic host configuration across multiple sites in software defined networks, according to embodiments of the present disclosure.

FIG. 2 illustrates a communications flow 200 for handling dynamic host configuration across multiple sites in SDNs, according to embodiments of the present disclosure. The communications flow 200 of FIG. 2 may be understood in conjunction with method 300 illustrated in the flowchart of FIG. 3 (when the first site 110a includes one border switch 120) and/or method 400 illustrated in the flowchart of FIG. 4.

As illustrated in FIG. 2, the communications flow 200 runs from a first host 140a, through a first edge switch 130a and a first border switch 120a located in a first site 110a, over a transit network 160, through a second border switch 120b and second edge switch 130b to a second host 140b of a DHCP server, and back. The first site 110a may also include a fourth edge switch 130d and (optionally) a fourth border switch 120d, and the second site 110b may also include a third edge switch 130c and a third border switch 120c, through which the communications flow 200 is not (or may optionally be) routed. In various embodiments, the first site 110a and the second site 110b may belong to one network fabric 100a, or may belong to separate network fabrics 100a and 100b. As will be appreciated, although FIG. 2 illustrates a set number of networking elements, more or fewer elements may be included in other embodiments.

Figure 3:
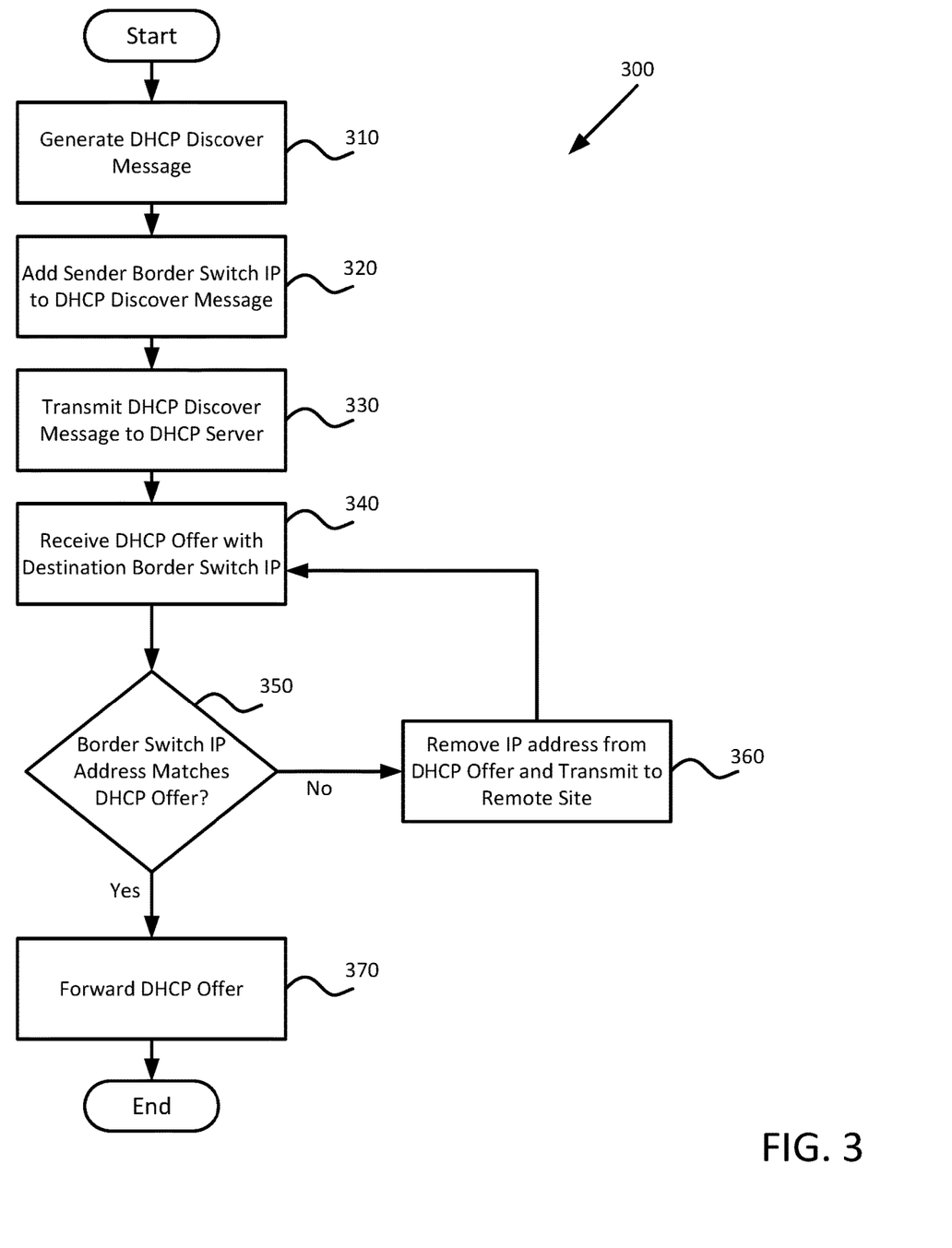
FIG. 3 is a flowchart of a method for handling dynamic host configuration across multiple sites in software defined networks, according to embodiments of the present disclosure.
Figure 4:
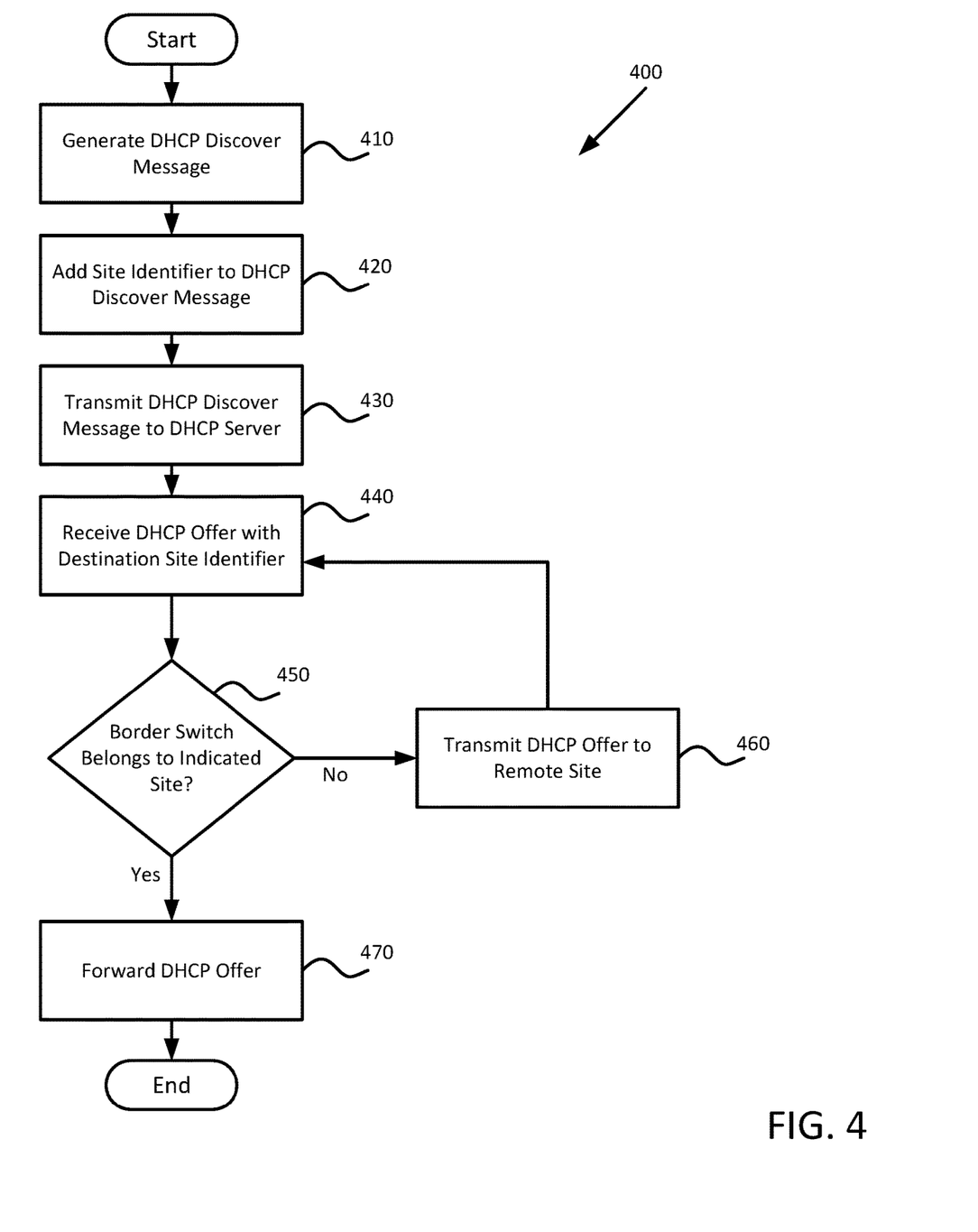
FIG. 4 is a flowchart of a method for handling dynamic host configuration across multiple sites in software defined networks, according to embodiments of the present disclosure.

The communication flow 200 begins when the first host 140a generates a DHCP discover message in a first communication 210, which the first edge switch 130a receives (per block 310 and block 410). The first edge switch 130a adds a sender routing data set of addressing information related to the sender site 110 and switches therein to the DHCP discover message, and transmits the DHCP discover message to the first border switch 120a in a second communication 220. The sender routing data set includes the sender gateway IP address (also referred to as gi-addr), a source edge switch IP address (i.e., the IP address of the first edge switch 130a), a sender virtual network identifier (e.g., the identifier for the network fabric 100a), and one of either a border switch IP address for the first border switch 120a (per block 320) or a site identifier for the first site 110a (per block 420). The border switch IP address and the site identifier provide identification for the borders of a particular site 110 in the network fabric 100 and may be collectively referred to as "border identifiers". For example, the border identifiers are included in a third communication 230 as part of the DHCP discover message for the DHCP server to include in the responsive DHCP offer packet so that the switches in the network fabric 100 can properly route the DHCP offer packet back to the appropriate host 140 in the indicated site 110. In various embodiments, the border identifier and other address information (i.e., the sender data set) are added to the DHCP discover message in the option 82 field, although in other embodiments the sender data set may be added to the DHCP discover message in other fields.

In embodiments in which the border identifier is a sender border switch IP address (added per block 320), the border identifier identifies the IP address of the border switch 120 that transmits the DHCP discover message from the first site 110a to the second site 110b in the third communication 230. Using FIG. 2 as an example, the sender border switch IP address would be the IP address of the first border switch 120a. In various embodiments, the sender edge switch 130 knows the sender border switch IP address because the site 110 includes a single border switch 120, or the sender edge switch 130 has been assigned (or chosen) to use a particular border switch 120 out of a plurality of available border switches 120 in the site 110. In some embodiments, each border switch 120 that handles the DHCP discover messages adds an associated IP address to the DHCP discover message to recursively build an IP pathway for the communications flow 200 to follow back when responding to the DHCP discover message.

In embodiments in which the border identifier is a site identifier (added per block 420), the border identifier identifies the site 110 from which the DHCP discover message is sent in the third communication 230. A site identifier includes a name (or other identifier) for the particular site 110 from which the third communication 230 is sent, and the identities of each border switch 120 in that site 110 (e.g., by name, IP address, or other unique identifier). Using FIG. 2 as an example, the site identifier would include identifiers for the first site 110a, the first border switch 120a, and the fourth border switch 120d.

Once the DHCP discover message is received at the DHCP server (e.g., the second host 140b in FIG. 2), the DHCP server is instructed to generate a DHCP offer packet that includes the network settings for the requesting host (e.g., an IP address for the first host 140a in FIG. 2) and a destination routing data set to route the DHCP offer packet back to the requesting host 140a. Because the DHCP offer packets are relayed in the network fabric 100 using gi-addr any-cast messages, the network fabric 100 may receive a DHCP offer packet from the DHCP server at any of the border switches 120 in the network fabric 100. To ensure delivery of the DHCP offer packet to the intended host 140, those border switches 120 need to determine how to route the DHCP offer packet within the network fabric 100, which may include hosts 140 located at different sites 110. Therefore, the DHCP server is instructed to use the border identifier and the other sender routing data included in the DHCP discover message to develop a set of destination routing data to be included in the DHCP offer packet, which enable the border switches 120 to route the DHCP offer packet to the correct site 110 and host 140. For example, the DHCP server creates and includes in the destination routing data set: a destination gateway address matching the sender gateway address, a destination edge switch identifier matching the sender edge switch identifier, a destination virtual network identifier matching the sender virtual network identifier, and a destination border identifier matching the sender border identifier. In various embodiments, the destination routing data set may be added to the option 82 field of the DHCP offer packet, although in other embodiments the destination routing data set may be added to the DHCP offer packet in other fields.

Once the DHCP offer packet is generated, the DHCP server transmits the DHCP offer packet to the second edge switch 130b in a fourth communication 240 to forward the DHCP offer packet back to the first site 110a. In FIG. 2, the fourth communication 240 routes the DHCP offer packet from the second host 140b through the second edge switch 130b to the second border switch 120b, but in other embodiments (e.g., using a Clos architecture), the fourth communication 240 may be routed through the second edge switch 130b to any border switch 120 in the second site 110b (e.g., the third border switch 120c) for transmission over the transit network 160 to the first site 110a.

When a border switch 120 receives the DHCP offer packet (per block 340 or block 440), the receiving border switch 120 determines where to route the DHCP offer packet; either to a border switch 120 at another site 110 over the transit network 160 as in the fifth communication 250, or to an edge switch 130 at the same site 110 as in the sixth communication 260. The border switch 120 analyzes the border identifier to determine how to handle and route the DHCP offer packet.

In embodiments in which the border identifier is a border switch IP address (e.g., as in method 300), the receiving border switch 120 determines whether the destination border switch IP address included in the DHCP offer packet matches an IP address associated with the receiving border switch 120 (per block 350).

In response to determining that the IP addresses do not match at block 350, the receiving border switch 120 transmits the DHCP offer packet to the intended border switch 120 at a remote site 110 (per block 360) using the destination border switch IP address. For example, as shown in FIG. 2 in regard to the DHCP offer packet received in the fifth communication 250, the second border switch 120b analyzes the destination border switch IP address included in the DHCP offer packet (received via the fourth communication 240), and transmits the DHCP offer packet to the first border switch 120a (via the fifth communication 250) in response to identifying that the IP address of the second border switch 120b does not match the destination border switch IP address.

In various embodiments in which the border identifier is a sender border switch IP address, the border switches 120 that handle the DHCP requests (the discover message or offer packet) recursively add (per block 320) and optionally remove IP addresses related to those border switches 120 to the DHCP requests to reduce handling of the DHCP requests. For example, the first border switch 120a adds an associated first IP address to the DHCP discover message, and the second border switch 120b adds an associated second IP address, encapsulating the first IP address, to the DHCP discover message. The DHCP server adds the second IP address with the encapsulated first IP address to the DHCP offer packet, and routes the DHCP offer packet to the second border switch 120b, based on the included second IP address. The second border switch 120b, on receipt of the DHCP offer packet, parses the DHCP offer packet so identify whether a second IP address associated with the second border switch 120b is included therein. In some embodiments, the second border switch 120b removes the second IP address from the DHCP offer packet for subsequent transmission. After exposing the encapsulated first IP address, the second border switch 120*b* uses the first IP address to encapsulate and transmit the DHCP offer packet to the first border switch 120*a*.

In response to determining that the IP addresses do match at block 350, the receiving border switch 120 forwards the DHCP offer packet to the intended edge switch 130 in the local site 110 (per block 370) using the destination edge switch IP address included in the destination routing data. For example, as shown in FIG. 2 in regard to the DHCP offer packet received in the fifth communication 250, the second border switch 120*b* analyzes the destination edge switch IP address included in the DHCP offer packet (received via the fifth communication 250), and transmits the DHCP offer packet to the first edge switch 130*a* (via the sixth communication 260) as indicated by the destination edge switch IP address.

In embodiments in which the border identifier is a site identifier, the receiving border switch 120 determines whether the site identifier includes an identifier for the receiving border switch 120 (per block 450).

In response to determining that the site identifier does not include an identifier for the receiving border switch 120 at block 450, the receiving border switch 120 transmits the DHCP offer packet to the intended site 110 (per block 460) as indicated by the source site identifier. For example, as shown in FIG. 2 in regard to the DHCP offer packet received in the fourth communication 240, the second border switch 120*b* analyzes the site identifier to identify a border switch 120 located at the first site 110*a* (as identified in the site identifier), and transmits the DHCP offer packet over the transit network 160 to one of the border switches 120 identified therein (e.g., the first border switch 120*a* or the fourth border switch 120*d*).

In response to determining that the site identifier does include an identifier for the receiving border switch 120 at block 450, the receiving border switch 120 forwards the DHCP offer packet to the intended edge switch 130 in the local site 110 (per block 470). For example, as shown in FIG. 2 in regard to the DHCP offer packet received in the fifth communication 250, the first border switch 120*a* analyzes the border switch IP addresses included in the DHCP offer packet (received via the fifth communication 250), and transmits the DHCP offer packet to the first edge switch 130*a* (via the sixth communication 260). In embodiments in which the fourth border switch 120*d* is included, the fifth communication 250 may be received by the fourth border switch 120*d* and forwarded to the first edge switch 130*a* as is described in relation to the first border switch 120*a*.

When the first edge switch 130*a* receives the DHCP offer packet via the sixth communication 260, the first edge switch 130*a* decapsulates the DHCP offer packet for the virtual network indicated in the destination routing data set and performs DHCP forwarding for the first host 140*a* as specified by DCHP or another messaging and routing protocol. Accordingly, DHCP requests are handled across multi-site SDNs using a shared IP subnet.

Figure 5:
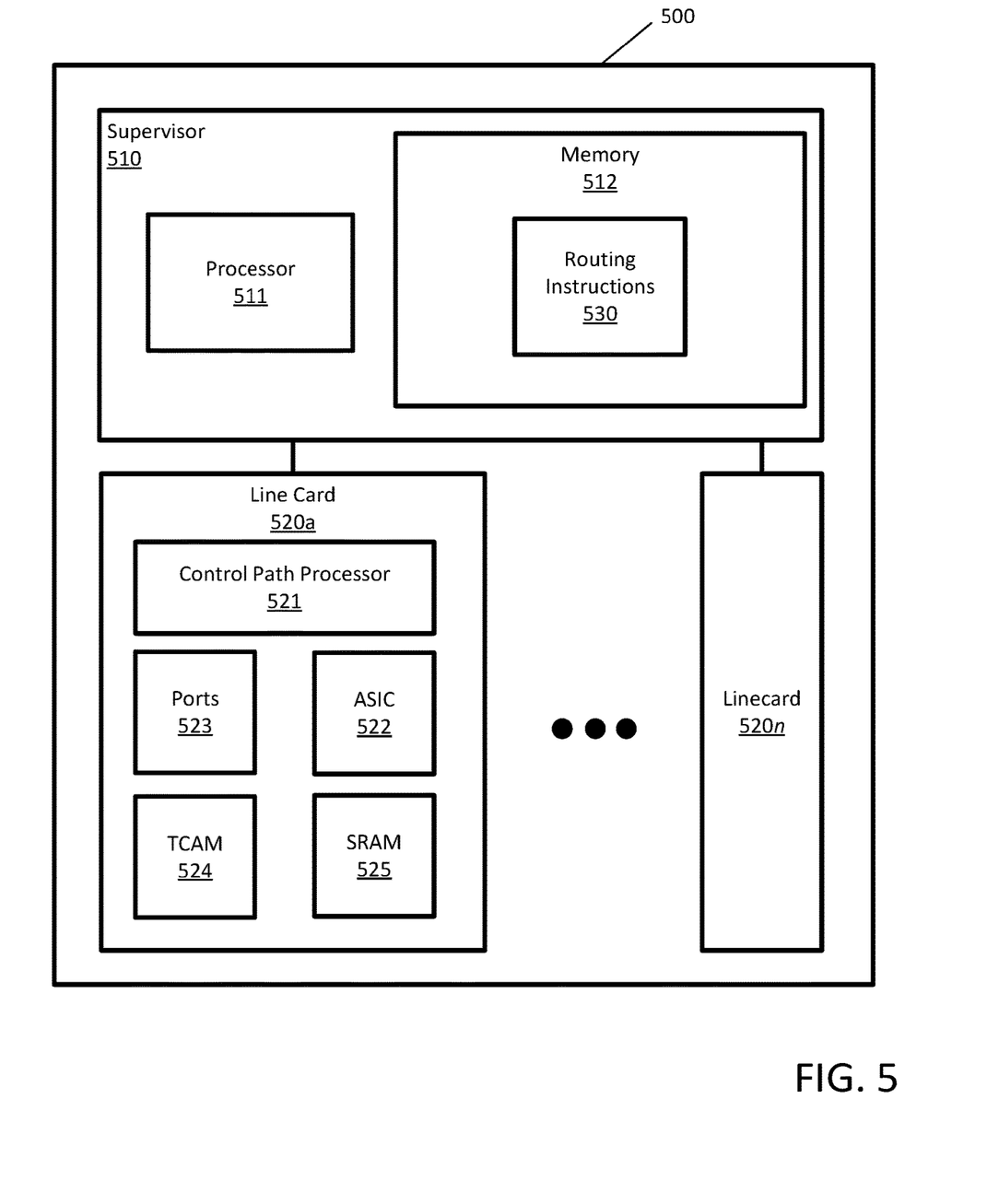
FIG. 5 illustrates hardware of a network switch, according to embodiments of the present disclosure.

FIG. 5 illustrates hardware of a network switch 500, as may be used as one of a border switch 120 or an edge switch 130 according to embodiments of the present disclosure. The network switch 500 includes a supervisor module 510 and a plurality of linecards 520*a-n*. The supervisor module 510 includes a processor 511 and memory 512. The memory 512 stores software instructions that are executed by the processor 511. In particular, the memory 512 may store various routing instructions 530, protocols, addressing information. In various embodiments, the routing instructions 530, when performed by the processor 511 enable the network switch 500 to perform one or more operations of methods 300 and/or 400, as discussed in relation to FIGS. 3 and 4 respectively.

Each linecard 520 includes a control path processor 521, an Application Specific Integrated Circuit (ASIC) 522, a plurality of ports/interfaces 523 coupled to the ASIC 522, a Ternary Content-Addressable Memory (TCAM) 524, and a Static Random Access Memory (SRAM) 525. The control path processor 521 is a CPU/processor that receives configuration commands from the supervisor module 510 to program the TCAM 524 and SRAM 525. The ASIC 522 is a hardware device that directs an incoming packet at a port/interface 523 to a particular other port/interface on another device based on the content of the TCAM 524 and SRAM 525. The ASIC 522 may buffer received packets in the TCAM/SRAM for delayed transmission to the other device. There may be multiple TCAM/SRAM pairs in a linecard 520

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    receiving, from a host, a DHCP (Dynamic Host Configuration Protocol) discover message at an edge network device of a site;
    adding to the DHCP discover message a sender border network device IP (internet protocol) address for a border network device of the site;
    transmitting the DHCP discover message, from the border network device to a DHCP server located externally of the site, wherein the DHCP discover message instructs the DHCP server to return a DHCP offer packet that includes a destination border network device IP address for a destination border network device of a destination site;
    receiving the DHCP offer packet from the DHCP server; and
    in response to determining that the destination border network device IP address matches the sender border network device IP address, forwarding the DHCP offer packet to the edge network device to perform DHCP forwarding.

2. The method of claim 1, further comprising:
    receiving a second DHCP offer packet from the DHCP server that includes a second destination border network device IP address; and
    in response determining that the second destination border network device IP address does not match the sender border network device IP address, transmitting the second DHCP offer packet to the second destination border network device IP address.

3. The method of claim 1, further comprising:
    before transmitting the DHCP discover message, adding to the DHCP discover message:
        a sender gateway address for the site;
        a sender edge network device identifier for the edge network device; and
        a sender virtual network identifier for a multi-site network to which the site belongs; and
    wherein the DHCP offer packet includes:
        a destination gateway address matching the sender gateway address;
        a destination edge network device identifier matching the sender edge network device identifier; and
        a destination virtual network identifier matching the sender virtual network identifier.

4. The method of claim 1, wherein the sender border network device IP address is included in an option field of a packet for the DHCP discover message.

5. The method of claim 1, wherein the sender border network device adds an associated IP address to the DHCP discover message before transmitting the DHCP discover message, and wherein the sender border network device removes the associated IP address from the DHCP offer packet before transmitting the DHCP offer packet.

6. The method of claim 1, wherein the DHCP server is located in a different network fabric than the edge network device.

7. A method, comprising:
    receiving, from a host, a DHCP (Dynamic Host Configuration Protocol) discover message at an edge network device of a site;
    adding to the DHCP discover message:
        a site identifier that includes identifiers for every border network device included in the site;
    transmitting the DHCP discover message, from one border network device included in the site to a DHCP server located externally of the site, wherein the DHCP discover message instructs the DHCP server to return a DHCP offer packet that includes a destination site identifier for a destination site;

receiving the DHCP offer packet from the DHCP server at a given border network device included in the site; and in response determining that a given identifier associated with the given border network device is included in the identifiers included in the destination site identifier, forwarding the DHCP offer packet to the edge network device to perform DHCP forwarding for the host.

8. The method of claim 7, further comprising:

receiving, at the given border network device, a second DHCP offer packet from the DHCP server that includes a second destination site identifier; and in response determining that the given identifier is not included in the second destination site identifier, transmitting the second DHCP offer packet to a listed border network device identified in the second destination site identifier.

9. The method of claim 7, further comprising:

before transmitting the DHCP discover message, adding to the DHCP discover message:
 a sender gateway address for the site;
 a sender edge network device identifier for the edge network device; and
 a sender virtual network identifier for a multi-site network to which the site belongs; and wherein the DHCP offer packet includes:
 a destination gateway address matching the sender gateway address;
 a destination edge network device identifier matching the sender edge network device identifier; and
 a destination virtual network identifier matching the sender virtual network identifier.

10. The method of claim 7, wherein the site identifier is included in an option field of a packet for the DHCP discover message.

11. The method of claim 7, wherein the DHCP server is located in a different network fabric than the edge network device.

12. A multi-site network, comprising:
 a first site, comprising:
  a first border network device communicatively connected with a transit network;
  a first host; and
  a first edge network device communicatively connecting the host with the first border network device;
 a second site, comprising:
  a second border network device communicatively connected with the transit network;
 wherein the first site is communicatively connected to the second site between the first border network device and the second border network device over the transit network;
 wherein in response to receiving a DHCP discover message from the host to a DHCP server, the first border network device is configured to:
  add a border identifier to the DHCP discover message; and
  transmit the DHCP discover message to the DHCP server;
 wherein in response to receiving a DHCP offer packet responsive to the DHCP discover message, the first border network device is configured to:
  in response to determining that the first site is an intended destination for the DHCP offer packet, forward the DHCP offer packet to the first edge network device to perform DHCP forwarding for the host; and
 wherein in response to receiving the DHCP offer packet responsive to the DHCP discover message, the second border network device is configured to:
  in response to determining that the second site is not the intended destination for the DHCP offer packet, forward the DHCP offer packet to the first site.

13. The multi-site network of claim 12, wherein the first border network device is configured to determine whether the first site is the intended destination of the DHCP offer packet based on a destination border identifier included in the DHCP discover message including an IP address matching an assigned IP address of the first border network device.

14. The multi-site network of claim 12, wherein the DHCP discover message includes a plurality of border network device IP addresses in the border identifier, wherein the plurality of border network device IP addresses correspond to a plurality of border network device is included at the first site.

15. The multi-site network of claim 12, wherein each border network device in the multi-site network that receives the DHCP discover message adds a related IP address for that border network device to the DHCP discover message, and wherein each border network device in the multi-site network that receives the DHCP offer packet removes the related IP address for that border network device from the DHCP offer packet.

16. The multi-site network of claim 12, wherein the first site further comprises a third border network device communicatively connected with the first edge network device;
 wherein the first site is communicatively connected to the second site between the third border network device and the second border network device; and
 wherein in response to receiving the DHCP offer packet responsive to the DHCP discover message, the third border network device is configured to:
  in response to determining that the first site is the intended destination for the DHCP offer packet, forward the DHCP offer packet to the first edge network device to decapsulate and perform DHCP forwarding for the host.

17. The multi-site network of claim 12, wherein the DHCP server is hosted at the second site, and wherein transmitting the DHCP discover message to the DHCP server comprises:
 transmitting the DHCP discover message to the second border network device; and
 forwarding the DHCP discover message to a second edge network device connecting the DHCP server to the second border network device.

18. The multi-site network of claim 12, wherein the DHCP discover message further comprises:
 a sender gateway address for the multi-site network;
 a virtual local area network identifier for the multi-site network; and
 a network device IP address for the first edge network device.

19. The multi-site network of claim 12, wherein the border identifier is included in an option field of the DHCP discover message.

20. The multi-site network of claim 12, further comprising a third site, comprising:
 a third border network device communicatively connected with the transit network, configured to:

in response to receiving the DHCP offer packet responsive to the DHCP discover message and in response to determining that the third site is not the intended destination for the DHCP offer packet, forward the DHCP offer packet to the first site.

* * * * *

UNITED STATES PATENT AND TRADEMARK OFFICE
CERTIFICATE OF CORRECTION

PATENT NO. : 10,812,446 B1
APPLICATION NO. : 16/518896
DATED : October 20, 2020
INVENTOR(S) : Satish Kumar Kondalam et al.

It is certified that error appears in the above-identified patent and that said Letters Patent is hereby corrected as shown below:

In the Drawings

On sheet 5 of 5, in Figure 5, reference numeral 520a, Line 1, delete "Line Card" and insert -- Linecard --, therefor.

In the Specification

In Column 2, Line 25, delete "in response determining" and insert -- in response to determining --, therefor.

In Column 7, Line 55, delete "DCHP" and insert -- DHCP --, therefor.

In Column 8, Line 19, delete "520" and insert -- 520. --, therefor.

In Column 8, Lines 47-55, delete "Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon." and insert the same on Column 8, Line 46, as a continuation of the same paragraph.

In the Claims

In Column 10, Line 27, in Claim 2, delete "in response determining" and insert -- in response to determining --, therefor.

In Column 11, Line 7, in Claim 7, delete "in response determining" and insert -- in response to determining --, therefor.

Signed and Sealed this
Twenty-second Day of December, 2020

Andrei Iancu
*Director of the United States Patent and Trademark Office*

CERTIFICATE OF CORRECTION (continued)
U.S. Pat. No. 10,812,446 B1

In Column 11, Line 16, in Claim 8, delete "in response determining" and insert -- in response to determining --, therefor.